US012619602B2

(12) United States Patent
Vig et al.

(10) Patent No.: US 12,619,602 B2
(45) Date of Patent: *May 5, 2026

(54) PROPAGATING RESOURCE SCALING INFORMATION BETWEEN SOURCE AND TARGET DATA STORES OF A MATERIALIZED VIEW

(71) Applicant: Amazon Technologies, Inc., Seattle, WA (US)

(72) Inventors: Akshat Vig, Seattle, WA (US); Sharatkumar Nagesh Kuppahally, Issaquah, WA (US); Bradley James Curran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/008,360

(22) Filed: Jan. 2, 2025

(65) Prior Publication Data

US 2025/0139083 A1 May 1, 2025

Related U.S. Application Data

(63) Continuation of application No. 17/548,373, filed on Dec. 10, 2021, now Pat. No. 12,222,932.

(51) Int. Cl.
*G06F 16/23* (2019.01)

(52) U.S. Cl.
CPC ...... *G06F 16/2393* (2019.01); *G06F 16/2358* (2019.01)

(58) Field of Classification Search
CPC .......................... G06F 16/2393; G06F 16/2358
See application file for complete search history.

(56) References Cited

U.S. PATENT DOCUMENTS 6,496,828 B1 * 12/2002 Cochrane ............ G06F 16/2471
707/999.01
7,158,994 B1 * 1/2007 Smith ................. G06F 16/2445
707/999.102

(Continued)

FOREIGN PATENT DOCUMENTS

CN 111694518 9/2020

OTHER PUBLICATIONS

U.S. Appl. No. 17/548,373, filed Dec. 10, 2021, Akshat Vig, et al.

*Primary Examiner* — William P Bartlett
(74) *Attorney, Agent, or Firm* — Robert C. Kowert; Kowert, Hood, Munyon, Rankin & Goetzel, P.C.

(57) ABSTRACT

A materialized view management service (MVMS) is capable of monitoring resource allocation changes of a source data object at a source data store and responsively generating resource change alerts to the owner of a target data object (the materialized view) in the target data store. Resource allocation changes may include autoscaling changes to the source data object's partition scheme, throughput limit, storage limit, and the like. The MVMS generates resource change alerts in response to these detected events and pushes the alerts to interested subscribers. Depending on the embodiment, the alerts may be pushed to human administrators, or the target data store itself, which may be configured to automatically adjust the resource allocation of the target data object to match the source data object. Advantageously, the disclosed alerts allow view owners to gain real time visibility of resource auto-scaling at the data source and appropriately react to such changes.

20 Claims, 10 Drawing Sheets

(56)           References Cited

U.S. PATENT DOCUMENTS

| | | | |
|---|---|---|---|
| 7,809,763 | B2 | 10/2010 | Nori et al. |
| 9,329,904 | B2 | 5/2016 | Wray et al. |
| 9,842,039 | B2 | 12/2017 | Siciliano et al. |
| 10,412,022 | B1 | 9/2019 | Tang et al. |
| 11,138,190 | B2 * | 10/2021 | Muralidhar ......... G06F 16/2471 |
| 11,372,885 | B2 * | 6/2022 | Martynov ............. G06F 16/243 |
| 11,640,412 | B2 * | 5/2023 | Chu ...................... G06F 16/275 |
| | | | 707/625 |
| 2019/0179941 | A1 * | 6/2019 | Williams .......... G06F 16/24535 |
| 2020/0379995 | A1 | 12/2020 | Rajaperumal et al. |
| 2021/0096778 | A1 | 4/2021 | Nagarajan et al. |
| 2023/0021006 | A1 * | 1/2023 | Jiang ................. G06F 16/24539 |

* cited by examiner

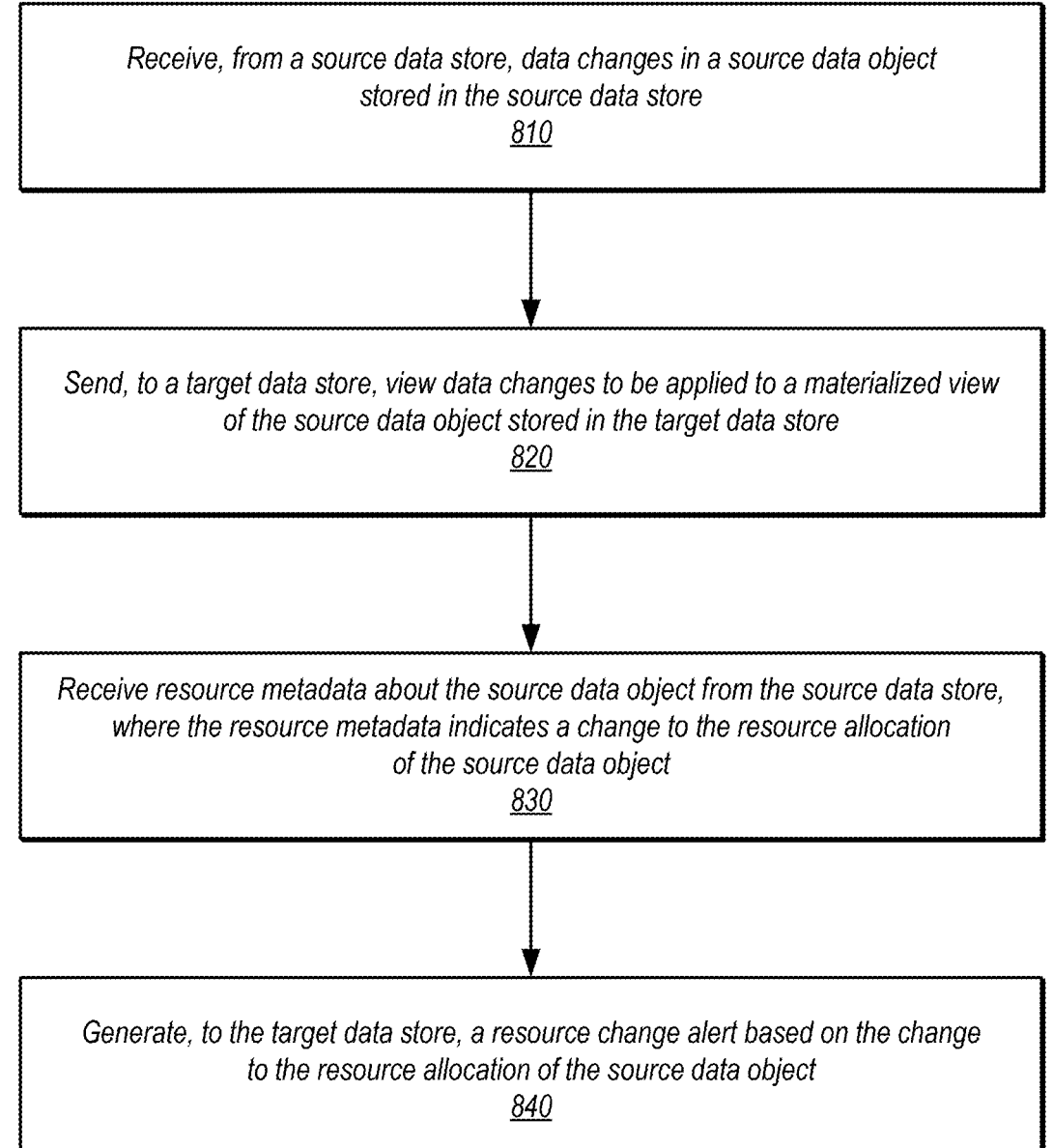

*Receive, from a source data store, data changes in a source data object stored in the source data store*
*810*

*Send, to a target data store, view data changes to be applied to a materialized view of the source data object stored in the target data store*
*820*

*Receive resource metadata about the source data object from the source data store, where the resource metadata indicates a change to the resource allocation of the source data object*
*830*

*Generate, to the target data store, a resource change alert based on the change to the resource allocation of the source data object*
*840*

*FIG. 8*

PROPAGATING RESOURCE SCALING INFORMATION BETWEEN SOURCE AND TARGET DATA STORES OF A MATERIALIZED VIEW

PRIORITY CLAIM

This application is a continuation of U.S. patent application Ser. No. 17/548,373, filed Dec. 10, 2021, which is hereby incorporated by reference herein in its entirety.

BACKGROUND

Customers of cloud-based service provider networks frequently use purpose-built databases to build applications. These purpose-built data stores may be implemented within the same cloud or across multiple clouds. Typically, customers building these applications write custom code to move data from one data store to another which requires long-term maintenance. As organizations accelerate the growth of application data in source data stores, they find that the custom-built solutions to move data become less reliable, and do not scale with the needs of their business. Reliability issues often lead to data backlog in the pipeline which incur additional developer and scaling costs. Processing terabyte scale data sets moving at thousands of requests per second per pipeline with these custom solutions require significant upfront planning and ongoing management of infrastructure at the source, targets and data transformation pipeline. As more and more of these data pipelines are built, the aggregate throughput can reach hundreds of millions of requests per second and the aggregate size of the pipelines can reach multiple petabytes. At such scale, the building, evolution, and operation of these data pipelines become significant challenges for the typical customer.

BRIEF DESCRIPTION OF THE DRAWINGS

FIG. 8 is a flowchart illustrating a process of propagating resource scaling information from a source data store to a target data store of a materialized view, according to some embodiments.

Figure 1:
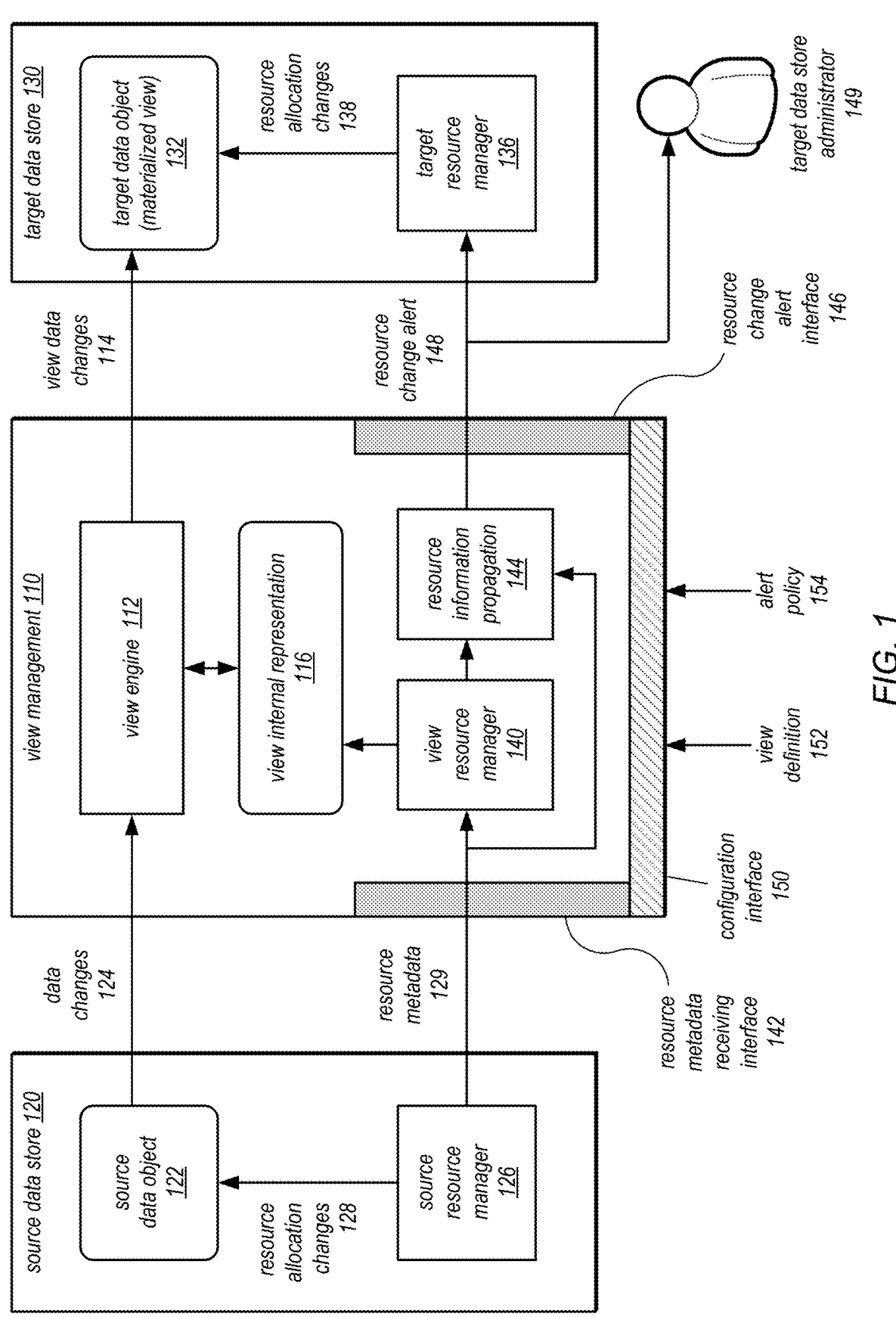
FIG. 1 illustrates a view management system that propagates resource scaling information between a source data store and a target data store of a materialized view, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Customers of cloud-based service provider networks frequently use purpose-built databases to build applications. These purpose-built data stores may be implemented within the same cloud or across multiple clouds. As organizations accelerate the growth of application data in source data stores, they find that custom-built solutions to move data between these data stores become less reliable, and do not scale with the needs of their business. Processing terabyte scale data sets moving at thousands of requests per second per pipeline with these custom solutions require significant upfront planning and ongoing management of infrastructure at the source, target, and data transformation pipeline. The aggregate throughput of these data pipelines can reach hundreds of millions of requests per second and the aggregate size of the pipelines can reach multiple petabytes. At such scale, the building, evolution, and operation of these data pipelines become significant challenges for the typical customer.

Some cloud-based service providers offer a materialized view service for implementing and maintaining custom data pipelines between heterogeneous data stores. The materialized view service may be configurable to move data between various data sources and targets that have varying degrees of performance, scale, data types, data models etc. The materialized view service may be implemented as a fully-managed model to provide clients a server-less experience, so that clients do not have to worry about scaling up or scaling down resources needed to process the source data. The service may monitor incoming traffic to the source data store(s) and auto-scale internal resources to match the amount of incoming traffic, up to a finite limit. However, this automatic scaling does not occur in the target data store. The materialized view service is not able to manage resources within the target data store. For example, the target data store may not be executing in the same cloud as the materialized view service. If the amount of write traffic from the source data store exceeds the target data store's capacity to handle the writes, the materialized view can experience poor performance or fail altogether.

To address these and other challenges in current data pipeline systems, embodiments of a materialized view management service (MVMS) are disclosed herein capable of propagating resource scaling information between the source data store and the target data store of a materialized view. In some embodiments, the MVMS is configured to monitor resource allocation changes of a source data object (e.g. a source table) at the source data store and responsively generate resource change alerts to the owner of a target data object (the materialized view) in the target data store. Resource allocation changes can encompass a variety of events depending on the type of source data store, and may include autoscaling changes on the source data object such as partition scheme changes, throughput limit changes, storage limit changes, and the like. In some embodiments, the MVMS generates resource change alerts in response to these detected events and pushes alerts about the events to interested subscribers (e.g. the target data store or administrators of the target data store). Accordingly, the MVMS propagates signals about resource allocation changes in the source data store to the target data store, allowing the target data store to scale its resources along with the source data store. For example, if the source data object suddenly increases its write throughput limit by ten-fold, the target data store owner will be given immediate notice of the increase so that appropriate measures can be taken at the target data store to cope with the spike in traffic (e.g., increase write capacity on the target table, temporarily suspend view updates, etc.). In some embodiments, the alerts generated by the MVMS allow target data owners to create a large number of views that can be scaled automatically and independently. These and other features and advantages of the disclosed system and methods are described in further detail below, in connection with the figures.

FIG. 1 illustrates a view management system that propagates resource scaling information between a source data store and a target data store of a materialized view, according to some embodiments.

As shown, the figure depicts a view management system 110, which may be implemented as part of a materialized view manage service (MVMS) 210 as discussed below with regard to FIG. 2. The MVMS may be implemented as part of a provider network or a private or on-premise network. View management system 110 may enable users to create views, such as materialized view 132, from different numbers and types of source data object(s) 122 in source data source(s) 120. The resultant view 132 may be stored in one or more target data store(s) 130.

Depending on the embodiment, data source(s) 120 may be many different types of data storage, processing, and/or management technologies, in some embodiments. For example, data source 120 may be a type of database (including relational databases, non-relational databases, graph databases, document databases, time series databases, data warehouses, or various other types of databases). As another example, data source 120 may include various data streaming services or services (e.g., data streams for data feeds, events, or other stream processing techniques). In some embodiments, data source 120 may be a messaging, notification, or other communication service. Various combinations of the different example data sources may be used or combined to create a materialized view (e.g., a materialized view that joins a database table with a data stream). Similarly, target data store 130 can be a type of data storage, processing, and/or management technologies, as discussed.

In some embodiments, the view 132 is stored in the target data store 130, and can be accessed via read requests such as queries. Various interfaces may be supported by target data store 130 to access the view 132, in various embodiments. For example, a SQL query may be made to access view 132 if target data store 130 is a relational database that supports SQL. However, if target data object 132 was stored in a non-relational database, then a request according to the programming language or interface of the non-relational database may be used to access the materialized view instead. In this way, materialized views can be deployed to targets that support different types of desired features for analyzing and accessing the materialized view, according to user preference.

Depending on the embodiment, the materialized view 132 can be defined in various ways. In some embodiments, a view definition 152 may be provided to view management system 110 via a configuration interface 150. For example, in some embodiments, a user interface or other type of interface (e.g. an Application Programming Interface (API)) can be used as a configuration interface to specify properties of the view, including the desired results (e.g., scan, get, join, aggregate, etc.), sources (e.g., by selecting data source(s) 120 from a list of offered sources), and targets (e.g., by selecting target(s) 130 from a list of offered targets). In some embodiments, target data store 130 can be one of the source data stores 120 (e.g., with the view stored in a different location, such as a different table in the same database).

In some embodiments, the view definition 152 can be specified as a query on the source data object 122 and in a query language (e.g., PartiQL). In this way, the view definition 152 can take advantage of a hub data model supported by view management system 110. The hub data model may be used by a view engine 112 to convert data changes 124 from the source data store 120 into a form that can be applied to the target data store 130. In some embodiments, the hub data model may be an extensible data format, in various embodiments (e.g., utilizing Ion Schema Language) that allows the data models of source data store(s) 120 and target data store(s) 130 to be described (e.g., as schemas using a schema language like Ion Schema Language). In this way, the data types natively supported in the source and target data store(s) can be enforced via the respective extensions of the hub data model.

In some embodiments, the view definition 152 may specify one or more mapping functions to convert a data type in the source data object 122 (e.g., a string value) into a character data type used in the target object 132. Instead of imposing a translation burden on source data store(s) 120 or the user that submits view definition 152 to translate from the source data model to the target data model, the data changes 124 may be provided in a format according to hub data model of the view management system 110, which in turn may use view engine 112 to convert the changes in a manner specified in view definition 152.

In some embodiments, the view management system 110 may implement a view engine 112. The view engine 112 may perform various operations to/on the captured changes and then reformat, package, encapsulate, or otherwise translate the changes to the view 132, and provide view updates 114 to update view 132. The data changes 124 from the source data store 120 may be received and processed by the view engine 112. Based on the data changes 124, the view engine 112 generates view data changes 114 for the target data object 132 and sends the changes to the target data store 130. In some embodiments, the incoming data changes 124 and view data changes 114 may be transmitted as data streams over persistent network connections. In some embodiments, the view engine 112 may implement a serverless execution model, where the resources used by the engine (e.g. processing nodes for a view pipelines) are provisioned or allocated based on the runtime needs of the pipeline. This elastic approach to resource allocation allows for more efficient usage of resources by the system, so that the system can simultaneously support a large number of views using a relatively small pool of resources.

In some embodiments, the view engine 112 may maintain an internal representation 116 of the view. In some embodiments, this internal representation 116 may be implemented using a sequential log, which stores data changes 124 on the source data object 122 in sequential order. The contents of the sequential log may be used by the view engine 112 to generate view data changes 114 to be sent to the target data store 130 and applied to materialized view 132. In some embodiments, the resources used by the internal representation 116 are scaled automatically, so that it can readily absorb spikes in the incoming data without causing significant increases in latency.

As shown, in some embodiments, the source data store 120 may implement a source resource manager 126. The source resource manager may be configured to make resource allocation changes 128 to the source data object 122. Examples of resource allocation changes may include changes to a number of partitions or shards used by the source data object, a number of nodes used to maintain the source data object (e.g. processing nodes that write the source data object or storage nodes that store data for the source data object), a write throughput limit of the source data object, a data storage limit of the source data object, or other types of resource usage characteristics. In some embodiments, the resources may be allocated for not just the source data object itself, but for a group of data objects in the source data store (e.g. objects owned by a particular user or stored in a particular instance, etc.). In some embodiments, the source resource manager 126 may implement resource allocation changes based on an auto-scaling policy, so that resource allocation changes are made automatically in response to detected runtime conditions (e.g. increase in the usage of the source data object). In some embodiments, the source resource manager 126 may allow users to manually change the resources allocation of the source data object.

As shown, in some embodiments, the view management system 110 is configured to receive resource metadata 129 from the source data store, which will include information indicating the resource allocation changes 128 to the source data object. In some embodiments, the resource metadata 129 may be received via a resource metadata receiving interface 142. In some embodiments, the resource metadata 129 may be received as part of the data changes 124. For example, the resource metadata 128 may be embedded in the data change stream of the source data object as metadata events or attributes. In some embodiments, the resources metadata 129 may be provided as a separate data stream that the view management system 110 can consume. In some embodiments, view management system 110 may implement a polling mechanism (e.g. describe object API call), which may be used periodically (e.g. once an hour) to extract the resource metadata. The results of the polling may be tracked by the view management system 110 to detect any changes over time.

As shown, in some embodiments, the resource metadata 129 indicating the resource allocation changes 128 may be used by a view resource manager 140 to control the resource allocation of the view internal representation 116. As discussed, in some embodiments, the view management system 110 may employ a serverless execution model that automatically adjusts resource allocation based on observed demand. The resources used to maintain a material view may include processing nodes used to consume the data changes 124, transform the data changes, and transmit the view data changes 114, and storage nodes used to store the internal representation 116 of the view. In cases where one source data object is used to generate multiple views, the view resource manager may allocate separate resources for each individual view. In some embodiments, the view management system may divide a single view into multiple partitions or shards, each with separately managed resources.

In some embodiments, when the view resource manager 140 detects a change in the resource allocation of the source data object, it will automatically adjust resource allocations for view(s) associated with the source data object. For example, if the source data store performs a partition split on the source data object to increase the write throughput capacity of the source data object, the view resource manager may perform a corresponding partition split operation to increase the number of nodes used to ingest the data changes 124. In some embodiments, the behavior of the view resource manager is controlled by a configurable resource management policy, which may be specified as part of the view definition 152. In some embodiments, the view resource manager 140 may be implemented as part of the view engine 112.

As shown, in some embodiments, the resource metadata 129 indicating the resource allocation changes 128 is also consumed by a resource information propagation component 144. The propagation component 144 may be configured to consume resource change information from both source data store 120 and the view management system 110, and generate resource change alerts 148 for interested subscribers. In some embodiments, a resource change alert 148 may be sent as part of the view data changes 114, for example, as a special metadata event or attribute in the view data change stream. The resource change alert 148 will indicate a resource allocation change 128 from the source data store 120 and/or a resource allocation change for a particular view in the view management system 110 (e.g. a partition scheme change). In some embodiments, the resource change alert 148 may indicate the value of a resource allocation metric (e.g. a write throughput limit or storage limit) determined based on any upstream resource allocation changes. In other embodiments, the generated alert may include information specifically directed for a target data store. For example, the resource change alert may indicate a specific resource allocation change to be made in the target data store 130.

As shown, in some embodiments, the resource change alert 148 is provided through a resource change alert interface 146. In some embodiments, interface 148 may be a push interface that broadcasts the alert to interested subscribers. In some embodiments, the interface 148 may enable users or other systems to access the resource metadata of the source data store or the view management system (e.g. through an API call). In some embodiments, the interface 148 may comprise a user interface (e.g. a graphical user interface, an email or messaging interface, etc.) for a user (e.g. an administrator 149 of the target data store). In some embodiments, the interface 148 may comprise a programmatic interface (e.g. an API or service interface), which may be used to transmit the alert 148 to a software component such as the target resource manager 136, which may use this information to make auto-scaling decisions on the target data object. In some embodiments, the alert 148 may include an auto-scaling instruction to the target resource manager component 136, directing the target resource manager 136 to make specific resource allocation changes 138 to the target data object 132 in response to upstream resource allocation changes.

In some embodiments, the behavior of the resource information propagation component 144 may be controlled by an alert policy 154 specified through the configuration interface 150. The alert policy 154 may be specified for individual views managed by the system. In some embodiments, the alert policy 154 may be specified as part of the view definition 152. The alert policy 154 be used to specify control parameters such as when a resource change alert 148 should be issued and what information should be included in the alert. For example, in some cases, an alert may indicate the actual resource change event that is received from the source data store. In some cases, the alert may indicate a performance metric of the view (e.g. an observed latency or data propagation backlog). In some cases, an alert may be generated whenever a resource allocation change is observed in the source data object. In some cases, the generation of the alert may depend on a host of different factors, including resource allocation changes in the view management system, performance metrics of the view, and the view definition of the view. In some embodiments, the alert policy 154 may be stored a part of the larger resource policy associated with a view that controls how a view can be configured (e.g. whether the view definition 152 can be expanded to include more data in light of the resource allocations of the source data object and target data object).

Figure 2:
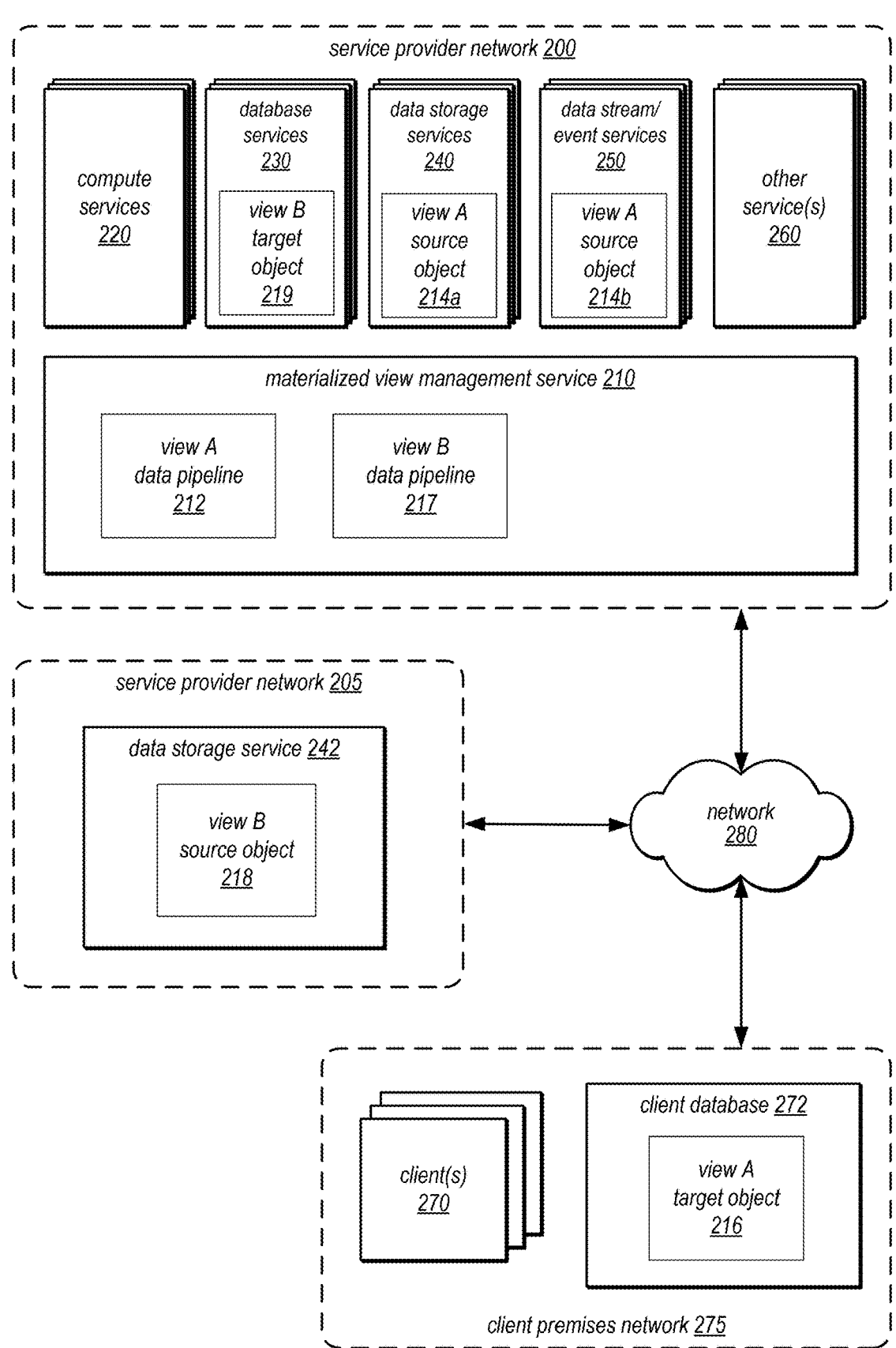
FIG. 2 illustrates a service provider network offering a materialized view management service and other services, including various data storage and processing services that generates materialized views according to received view, according to some embodiments.

FIG. 2 illustrates a service provider network offering a materialized view management service and other services, including various data storage and processing services that generates materialized views according to received view, according to some embodiments.

Service provider network 200 may be a private or closed system or may be set up by an entity such as a company or a public sector organization to provide one or more services (such as various types of cloud-based storage) accessible via the Internet and/or other networks to clients 270 in a client premises network 275, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, services, resources, or services, such as a materialized view management service 210, compute services 220, database service(s) 230, (e.g., relational or non-relational (NoSQL) database query engines, map reduce processing, data flow processing, and/ or other large scale data processing techniques), data storage service(s) 240, (e.g., an object storage service, block-based storage service, or data storage service that may store different types of data for centralized access), data stream and/or event services 250, and other services 260 (any other type of network based services (which may include various other types of storage, processing, analysis, communication, event handling, visualization, and security services not illustrated).

Similarly, service provider network 205 is another service provider network that offers various types of cloud-based services implemented by another service provider company. The services offered by service provider network 205 (e.g. data storage service 242) may be implemented differently and expose different access interfaces (e.g. APIs) than the services (e.g. data storage services 240) implemented in service provider network 200.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 240) may be implemented by a particular node or may be distributed across several nodes. In some embodiments, a given node may implement the functionality of more than one service system component (e.g., more than one data store component).

Compute services 220 may be implemented by provider network 200, in some embodiments. Compute services 220 may offer instances, containers, and/or functions according to various configurations for client(s) 270 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client(s) 270 applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length.

In various embodiments, database services 230 may be various types of data storage and processing services that perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, database services 230 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 230 may include services that process requests to data that is not stored in fully structured storage (e.g., non-relational or NoSQL databases). Database services 230 may access the data that is semi-structured or not-structured in storage, such as data objects of unstructured or semi-structured data in a separate data storage service, in one embodiment. In other embodiments, database services 230 may locally store, manage, and access semi-structured or not-structured data.

In some embodiments, database services 230 may implement various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of the data storage services 240. Various other distributed processing architectures and techniques may be implemented by database services 230 (e.g., grid computing, sharding, distributed hashing, etc.). Note that in some embodiments, data processing operations may be implemented as part of data storage service(s) 240 (e.g., query engines processing requests for specified data).

Data storage service(s) 240 and 242 may implement different types of data stores for storing, accessing, and managing data on behalf of clients 270 as a network-based service that enables clients 270 to operate a data storage system in a cloud or network computing environment. For example, one data storage service 240 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 240 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services 250 may provide resources to ingest, buffer, and process streaming data in real-time. In some embodiments, data stream and/or event services 250 may act as an event bus or other communications/notifications for event driven systems or services (e.g., events that occur on service provider network 200 services and/or on-premise systems or applications).

Generally speaking, clients 270 may encompass any type of client configurable to submit network-based requests to service provider networks 200 and 205 via network 280, including requests for a materialized view management service (MVMS) 210 (e.g., a request to create a materialized view from different data sources of the other provider network services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in service provider networks 200 and 205 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with service provider networks 200 and 205. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to service provider networks 200 and 205 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service (s) 240 may be coordinated by client 270 and the operating system or file system on behalf of applications executing within the operating system environment. Note that in some embodiments, clients may instead (or also be) implemented as part of a service or other resource of service provider network 200 (e.g., a compute instance, container, or function of compute services 220).

Clients 270 may convey network-based services requests (e.g., materialized view creation requests) to and receive responses from service provider networks 200 and 205 via network 280. In various embodiments, network 280 may encompass any suitable combination of networking hardware and protocols necessary to establish network-based-based communications between clients 270 and service provider networks 200 and 205. For example, network 280 may generally encompass the various telecommunications networks and service providers that collectively implement the Internet. Network 280 may also include private networks such as local area networks (LANs) or wide area networks (WANs) as well as public or private wireless networks. For example, a given client 270 and service provider networks 200 and 205 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider networks 200 and 205. It is noted that in some embodiments, clients 270 may communicate with service provider networks 200 and 205 using a private network rather than the public Internet.

As shown in this example, the materialized view management service 210 may be used to maintain materialized views between heterogenous data stores and across different environments. The MVMS 210 may be used to implement an embodiment of view management system 110, as discussed in connection with FIG. 1. As shown, the MVMS 210 implements a first view (view A) by executing a data pipeline 212 from two source data objects 214a and 214b in the service provider network 200 to feed data to materialized view 216 stored in a client database 272 in the client premises network 275. As discussed, materialized view A may be established via the MVMS 210 according to a view definition specified by the client. As discussed, the MVMS 210 may implement resource information sharing (e.g. using resource information propagation component 144) between the data sources 240 and 250 and the client database 272, so that events such as resource allocation changes in one data store is forwarded to the other data stores involved in the view, allowing such other data stores to appropriately adjust their own resource allocations.

As another example, the figure depicts another materialized view B, which is supported by a data pipeline 217 implemented by the MVMS 210. Materialized view B is stored as a target data object 219 in a database service 230 of the service provider network 200, and sources its data from a source object 218 stored in the data storage service 242 of the service provider network 205. The MVMS 210 is able to interoperate with these different data stores through standardized interfaces and/or specially configured data store connectors, so that materialized views can be established across virtually any combination of source and target data stores.

Figure 3:
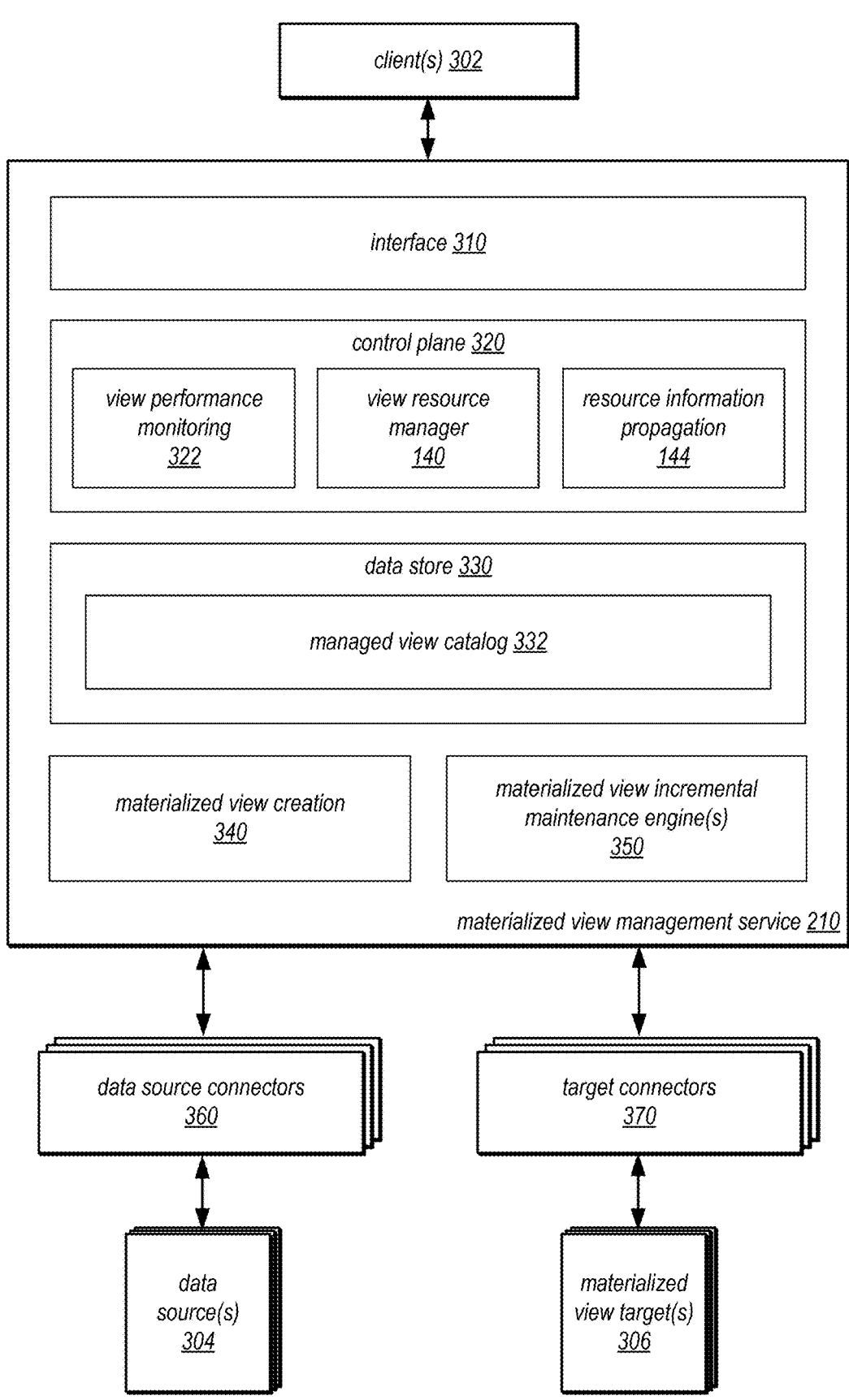
FIG. 3 illustrates an embodiment of a materialized view management service that implements managed materialized views created from data sources, according to some embodiments.

FIG. 3 illustrates an embodiment of a materialized view management service that implements managed materialized views created from data sources, according to some embodiments.

The figure depicts client(s) 302 of the materialized view management service 210, which may be similar to client(s) 270 in FIG. 2 above or other types of client systems, services or applications. Client(s) 302 may access materialized view management service 210 via interface 310. Interface 310 may be a graphical user interface (e.g., implemented as a console or other graphical control view of a website). Interface 310 may be implemented as a command line interface, in some embodiments. Interface 310 maybe implemented as one or multiple programmatic interfaces, (e.g., one or more APIs).

As discussed in connection with FIG. 1, in some embodiments, the interface 310 may also include a resource metadata receiving interface 142 that is configured to receive resource metadata 129 from various data stores associated with views managed by the MVMS 210. Such resource metadata may be forwarded among the data stores or trigger resource change alerts 148 to be generated to the data stores. The outgoing interface (e.g. resource change alert interface 146) may also be implemented as part of the interface 310.

As shown, the materialized view management service 210 may implement a control plane 320. Control plane 320 may implement various features for managing the resources and operations for creating and maintaining materialized views.

For example, control plane 320 may implement various access control mechanisms or authentication techniques to ensure that requests to create materialized views are made with appropriate authorization (e.g., to create or delete a materialized view).

In some embodiments, control plane 320 may implement various health or other system monitoring features to ensure that various features or components of materialized view management service are functioning correctly, repaired, or replaced. For example, control plane 320 may monitor a number nodes or instances used to implement view creation 340 and materialized view incremental maintenance engine(s), such as may be collected in pools or groups of instances, and replace, increase, or decrease the number of nodes or instances in order to meet demand or handle failures. In some embodiments, such functions may be implemented by the view resource manager component 140 of the MVMS 210.

In some embodiments, control plane 320 may implement view performance monitoring component 322 in order to monitor the performance of creating and maintaining a materialized view, in some embodiments. For example, view performance monitoring 322 may collect or request performance metrics for change data capture, view computation, and view materialization to send the results to target data stores, and determine whether or not performance criteria for the view has been met. For example, performance criteria may include a lag time or other indicator for the time between when a change occurs at a source and when the change is included in an update made to a target. If the lag time exceeds a threshold amount of time (e.g., 10 minutes), then an adjustment event to reduce the lag time may be triggered (e.g. causing an amount of resources for the view to be increased). Other performance criteria may include the amount of data that is being received as a change (e.g., how many records, items or objects, or the size of data, such as 5 megabytes), or the amount of backlog change data buffered for a view. Performance criteria may include criteria specified for the materialized view by a user, owner, developer, or operator via view interface 310. In some embodiments, the specified requirements may include limitations or other restrictions on the utilization of some resources (e.g., a limit on the amount of read or write load placed on a data source or target).

In some embodiments, control plane 320 may implement view performance adjustments to dynamically scale the resources associated with creating and maintaining a materialized view, using a component such as the view resource manager 140. In this way, a serverless experience can be provided, as the provisioning, management, allocation of resources may be handled by materialized view management service 210 (instead of by a user that is manually specifying the amount of resources to implement for a materialized view. View performance adjustments may determine responsive actions to adjust materialized view creation and performance according to view performance monitoring 322 (e.g., according to the number and/or type of events detected). For example, view performance adjustments may increase (or decrease) the number of nodes assigned to view maintenance processing in order to keep pace with an increased number of changes received from data sources.

In some embodiments, control plane 320 may implement the resource information propagation component 144. As discussed in connection with FIG. 1, the propagation component 144 may be tasked with propagating resource metadata among the data sources that implement a materialized view (from a source data store to a target data store or vice versa). The resource metadata may be transmitted in the form of a resource change alert 148, which may be generated in response to a change in the resource allocation of one of the data stores (source data store 120 or target data store 130). In some embodiments, the resource change alert 148 may be generated as the result of the performance metric of a view, as measured by the view performance monitoring component 322. In some embodiments, the generated alert may indicate the view's recent performance information, for example, measured values of the performance metrics.

In some embodiments, control plane 320 may maintain, update, and/or access managed view state. Managed view state may indicate the state of various materialized views as the progress between creation and maintenance phases as well as other state information that informs operations or workflows performed on behalf of a materialized view. For example, managed view state may indicate in state information for a materialized view that the target for that the last maintenance operation to update a materialized view occurred 10 minutes ago and that another check for updates should be performed. Managed view state may identify and/or provide information for various features of materialized view creation 340 and materialized view maintenance 350.

In some embodiments, a materialized view creation component 340 may be configured to handle requests to create a materialized view. For example, materialized view creation 340 may perform initial validation of a view, such as checking the string length and basic structure. In some embodiments, materialized view creation 340 may generate maintenance or other execution plans to create and update the materialized view. In some embodiments, materialized view creation 340 may store the maintenance or other execution plan along with other artifacts to facilitate the materialized view in managed view catalog 332. In some embodiments, materialized view creation 340 may assign, provision, or initiate a materialized view incremental maintenance engine 350 to handle a materialized view (e.g., to obtain changes, generate view updates and store view updates to an out-bound log for the materialized view). Materialized view creation 340 may provide materialized view incremental maintenance engine(s) 350 assigned to a materialized view with the appropriate information (e.g., identifier for generated maintenance plan, identities of input and output logs for the data source(s) and target for the materialized view, etc.).

In various embodiments, data store 330 may be implemented as part of materialized view management service 210. For example, materialized view management service 332 may implement the managed view catalog 332. Managed view catalog 332 may store information related to materialized views, including a name, definition, access controls or configuration, maintenance and/or other historical information to indicate the progress or performance of a materialized view (e.g., last time updated). Managed view catalog 332 may store various state information or other metadata, such as metadata to describe the mappings between change logs for in-bound changes from source connector(s) 360 and out-bound changes to target connector(s) 370.

In some embodiments, the materialized view management service 210 may implement data source connectors 360. Data source connectors 360 may communicate with and obtain changes from data source(s) 304. In some embodiments, a data source connector 360 may facilitate a change capture protocol or interface for a particular type of data store (e.g., a MySQL connector, a data stream connector, an object store connector) for a corresponding one of data source(s) 304. In some embodiments, data source connectors 360 are implemented as part of a service or storage system implementing data source(s) 304. As discussed above data source(s) 304 can be various services (or resources hosted within services) of service provider network 200.

For example, data source connectors 360 may enable a changed data capture stream supported by a source database, and register as a recipient, authorized reader, or other component capable of obtaining updates to that source as a change stream. In some embodiments, the data source may be a data stream, and thus the data source connectors 360 may register or request to be a recipient of the data stream. In some embodiments, change data capture may poll for source changes. For example, data connector(s) 360 may record or maintain the state of previously received changes from a source (e.g., by timestamp, version identifier, etc.) and use the state to request changes that occurred since the last received state. The changes captured by data source connectors may be sent via interface 310 to a source-specific change log (e.g., an append-only change log implemented via a log-based database, ledger database, or other log-structured storage) in a format corresponding to the hub data model (e.g., in ION format) via which materialized view incremental creation engines 350 may read from the logs of corresponding sources contributing to a view. Source connectors 360 may report source progress or performance information to control plane 320. In this way, control plane 320 can make performance determinations to adjust the performance of connectors, in some embodiments.

In some embodiments, materialized view increment maintenance engine(s) 350 may obtain or generate a maintenance plan or other execution plan for updating a created materialized view. A maintenance plan may describe the various operations for combining changes to various updates received from the data sources to provide an updated view without regenerating the entire materialized view (e.g., without re-querying all sources to obtain all of the materialized view information). In some embodiments, view maintenance processing nodes may implement maintenance plan optimization to rewrite or utilize various features, such as intermediate results stored in intermediate tables and/or utilization local computational capabilities and storage, such as maintenance computation data (instead of using source computational storage and/or capabilities). In this way, view maintenance processing nodes can adapt to the capabilities of the data sources (e.g., supported or unsupported processing operations, such as supporting or not supporting joins, aggregations, etc.) or limitations on the data sources (e.g., read or write limitations on the data sources).

In some embodiments, materialized view incremental maintenance engine(s) 350 may implement maintenance plan execution. In some embodiments, view maintenance plan execution may be a query engine or processor that can perform the maintenance plan to obtain the changed data (as well as other data needed to make the update). If, for instance, a change is to a value that is joined with other data sources, then even if the other data sources are unchanged, the change may still need to be joined with the data from the unchanged sources, so a query may be performed to obtain that unchanged data from the data sources (or in the event it is stored as part of maintenance computation, the local copy can be utilized). Materialized view incremental maintenance engine(s) 350 may store records (e.g., in hub data model format) to an outbound log of changes specific to the materialized view, in some embodiments.

In some embodiments, materialized view incremental maintenance engine(s) 350 may rely upon external computation resources (e.g., compute function resource as discussed above with regard to FIG. 2 of compute services 220), which may perform an operation or determine a value used as part of updating a materialized view. Similarly, some data or query operations can be performed by data source resources, and thus queries may be performed as part of determining updates to a materialized view.

In some embodiments, materialized view incremental maintenance engine(s) 350 may report progress and performance information to control plane 320. In this way, control plane 320 can evaluate the performance of operations to determine updates and make adjustments to scale the resources allocated to the materialized view (e.g. via the view resource manager 140) to satisfy performance criteria.

In various embodiments, the interface 310 of the materialized view management service 210 may support requests or other interactions with target connector(s) 370. Target connector(s) 370 may connect to and interact with a target data store for a materialized view. Similar to a data source connector 360, a target connector 370 can be respectively implemented for different types of targets (e.g., a target connector for a data warehouse or a target connector for a NoSQL database). As discussed above, materialized view target(s) 306 can be various services (or resources hosted within services) of a service provider network. In some embodiments data source(s) 304 and/or materialized view target(s) 306 can be implemented partially or completely external to a service provider network hosting the MVMS 210 (e.g., at an on-premise network or at another provider service network). In some embodiments, materialized view management service 210 may allow for custom or user-implemented target or source connectors to be used (e.g., uploaded via an interface and deployed for a requested materialized view) to customize the change data capture or materialized view export (e.g., from on-premise or custom data sources or targets).

Once changes to a materialized view have been computed from the changes of a data source (e.g., from delta log records received in the one or more inbound logs for the corresponding data sources 304), then changes to the materialized view may be materialized by materialized view management service 210. For example, materialized view incremental maintenance engine(s) 350 may store the updates to a view-specific change log (e.g., an append-only change log implemented via a log-based database, ledger database, or other log-structured storage) in a format corresponding to the hub data model (e.g., in ION format) via which target connectors 370 implemented in the target data store service (or implemented interact specifically for the target data store) may read from the logs of corresponding sources contributing to a view. Target connectors 370 may be implemented to interact with a target for a materialized view by applying the described changes to the materialized view.

For example, target connector(s) 370 may obtain the changes to be made to a materialized view, in various embodiments. In various embodiments, target connectors 370 may implement target-specified update translation. For example, target-specific update translation from the hub data model may be performed, including data type conversions, operation conversions, and/or generate the request parameters needed to perform an update request to make a corresponding change in the materialized view according to the interface of the target system. In some embodiments, target connector(s) 370 may enforce ordering constraints. In some embodiments, target connector(s) 370 may perform deduplication to prevent duplicate updates from being performed. For example, target connector(s) 370 may track the updates successfully performed (as discussed above) in order to prevent a failure from causing an already performed update from being re-performed.

Figure 4:
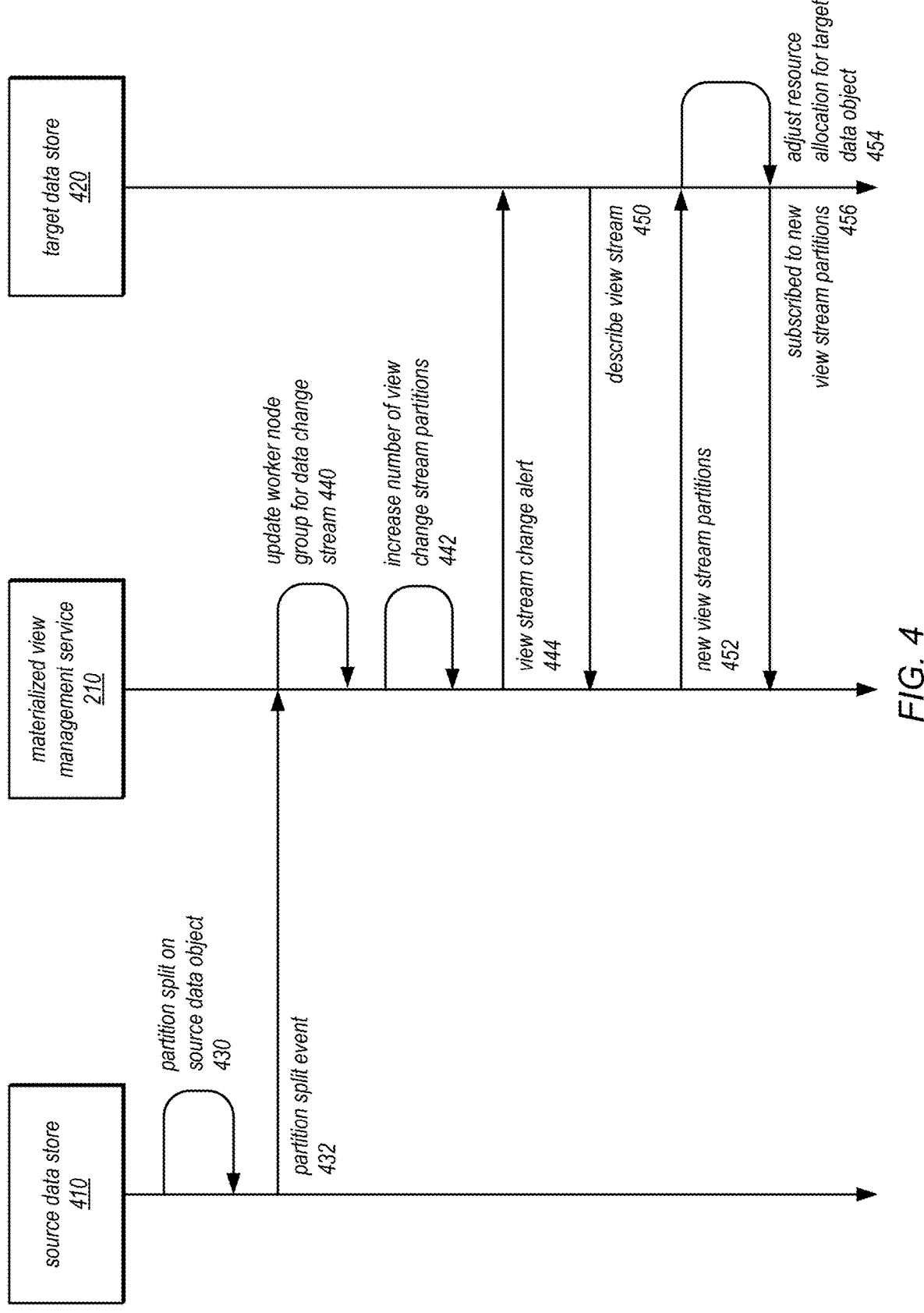
FIG. 4 is a sequence diagram illustrating a process of propagating resource scaling information from a source data store of a materialized view to a target data store, according to some embodiments.

FIG. 4 is a sequence diagram illustrating a process of propagating resource scaling information from a source data store of a materialized view to a target data store, according to some embodiments. The figure depicts interactions among a source data store 410, the MVMS 210, and a target data store 420. The source data store 410 and target data store 420 may be the source data store 120 and target data store 130 of FIG. 1, respectively.

As shown, the sequence starts with a partition split 430 occurring on the source data object in the source data store 410. In some embodiments, the source data store may manage resources for a data object (e.g. a table) in terms of partitions, which may be divided based on data values (e.g. a partition key) in the table. Each partition may be allocated a specified set of resources (e.g. compute nodes and storage nodes) that are used to read and write the partition. In some embodiments, if demand on a partition (e.g. write throughput) reaches a certain level, the source data store may "split" the partition to create two or more new partitions to meet the demand. In some embodiments, multiple partitions may be merged if there is low demand. These partitions may be managed automatically by the data store to auto-scale the resources used by the source data object, and a change in the partition scheme represents a resource allocation change on the source data object.

At operation 432, a partition split event 432 is generated by the source data store 410. In some embodiments, this event may be generated as part of the data change stream of the source data store, which is recognized by the data change handling components of the MVMS 210. In some embodiments, the event may be generated through an API exposed by the source data store, which third party listeners (e.g. MVMS 210) can subscribe to. In some embodiments, a partition split event may indicate that an existing partition of the source data object is terminated or sealed (so that no more writes can occur on that partition), and identify new child partitions that are taking over for the sealed partition. This information will allow the MVMS 210 to adjust its resources for handling the data change stream from the source data object (e.g. provision additional processing nodes and open new network connections). Event 432 is an embodiment of the resource metadata 129 described in FIG. 1.

At operation 440, the MVMS 210 updates a worker node group assigned to ingest the source data object's data change stream. In some embodiments, this operation may be performed by the view resource manager 140 as part of an auto-scaling operation. In some embodiments, resources used by the view (e.g. worker nodes and storage nodes) are partitioned or sharded based on the partition scheme of the source data object. This arrangement allows the MVMS to scale the view resources along with the resources of the source data object. In some embodiments, the view resource manager may allocate more resources to a particular partition that is seeing a lot of write traffic, and fewer resources to other partitions that are relatively quiet. In some embodiments, a partition split event from the source data store may cause a release of current view resources allocated to the old partition, and new view resources to be provisioned to handle the new children partitions.

Additionally, the MVMS 210 may perform a number of data or operational checks during this process to ensure an error-free transition from the old partition scheme to the new partition scheme. For example, MVMS 210 may ensure that new worker nodes provisioned for the children partitions will write the same internal representation of the view (e.g. a data change log) as did the worker nodes of the parent partition, and in the correct order (e.g. according to a log sequence number indicated in the change data stream). In some embodiments, the MVMS 210 may ensure that no writes will occur on the old partition after it is sealed, and that initial writes to the child partitions correctly match the ending states of previous writes on the parent partition, etc.

At operation 442, the MVMS 210 increases the number of view change stream partitions used to transmit view change data to the target data store 420. In some embodiments, the view change data may be separated into partitions or shards in order to speed up transmission of view change data over the network and promote robustness of the transmission. Each outgoing stream partition may be transmitted over a separate network connection. In some embodiments, the number of partitions of the view change stream may be initially specified by the target data store (e.g. as a parameter when the target data store is initially registered to the MVMS 210). In some embodiments, an increase in the number of view stream partitions is triggered by the partition split event on the source data object, and is performed by the MVMS as part of the autoscaling of view resources at the MVMS.

At operation 444, a view stream change alert 444 is generated and transmitted to the target data store 420. Alert 444 is an embodiment of the resource change alert 148 of FIG. 1. In some embodiments, the alert 444 may be transmitted in the normal view change stream produced by the MVMS. For example, the alert 444 may indicate that a particular partition or shard of the view change stream is terminating or being sealed. In some embodiments, the alert 444 may not indicate the full details of the partition split event or the view change stream, but only that a change has occurred in the view change stream. This causes the target data store 420 to generate a describe view stream request 450 to obtain the details of the view change stream.

At operation 452 and in response to the describe view stream request 450, the MVMS 210 sends a response 452 describing the new partitions of the view stream. In some embodiments, this response may indicate additional metadata about the view stream, such as the current state of the stream partitions, recommended resource allocations for handling each stream partition, and recent performance metrics (e.g. data backlog, latency, etc.) for each stream partition, etc. This information may be used by the target data store 420 to adjust 454 its resource allocation for the target data object (the materialized view). For example, the target data store may update its partition scheme for the target data object based on the change in the view change stream. Finally, at operation 456, the target data store 420 sends a subscription request 456 to subscribe to the new view change stream partitions. In some embodiments, this operation may involve establishing new network connections to the MVMS 210 using the newly allocated resources for the materialized view in the target data store.

Figure 5:
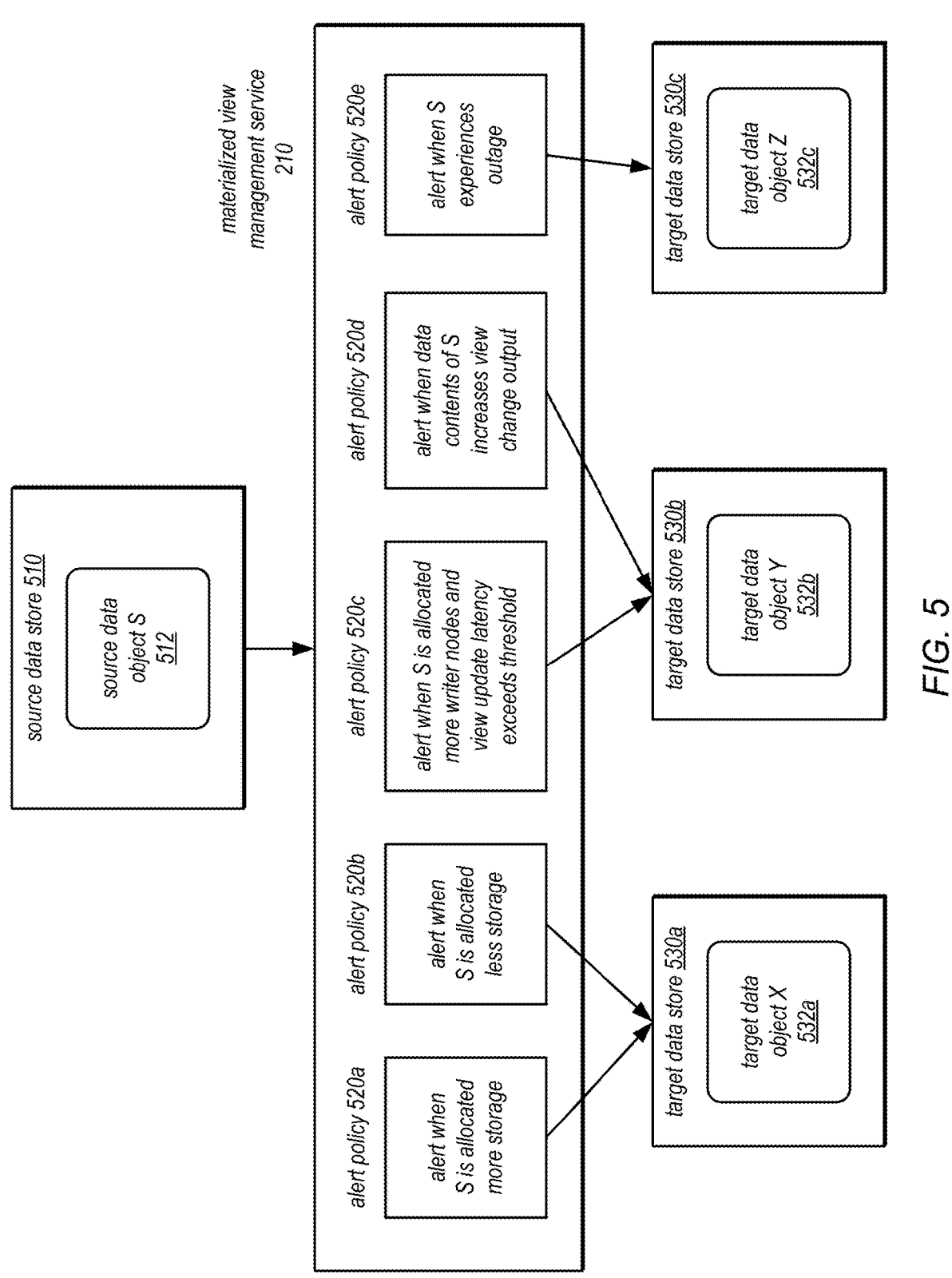
FIG. 5 illustrates a materialized view management service that allows users to configure custom resource change alert policies for materialized views, according to some embodiments.

FIG. 5 illustrates a materialized view management service that allows users to configure custom resource change alert policies for materialized views, according to some embodiments.

As shown, in this example, the MVMS 210 implements three different views 532*a-c* in three target data stores 530*a-c* based on the same data source object S 512 in a source data store 510. Each view 532*a-c* is configured with a set of resource change alert policies 520*a-e*, which controls how the MVMS propagates resource change alerts for each view. As discussed, in some embodiments, the MVMS 210 may provide a configuration interface for these policies so that view owners can define custom resource alerts for their view.

As shown, alert policy 520*a* specifies that an alert will be generated for view 532*a* when the source data object S allocates more storage. In response to such an alert, additional storage resources can be allocated to the target data object X 532*a* to keep up with the source data object. On the other hand, alert policy 520*b* will cause an alert to be generated when the allocated storage space of the source data object S is reduced. Such an alert will allow the target data object X to be scaled down with the source data object S in order to save resource usage at the target data store 530*a*.

Alert policy 520*c* specifies an alert to be issued when the source data object allocates additional write nodes and an update latency metric of view 532*b* exceeds a threshold. Thus, this alert is dependent on not just on the resource changes of the source data object, but also the actual performance of the view (e.g. as observed by the view performance monitoring component 322). Such a policy may be used to reduce the number of inconsequential alerts generated by the MVMS. For example, in some situations, materialized view Y 532*b* may not be impacted by most resource allocation changes at the source data object (e.g. view Y may only be drawing data from a particular data partition). The alert policy 520*b* will generate an alert only when a resource change actually impacts the performance of view Y.

Alert policy 520*d* is specified for the same target data object Y 532, and specifies that an alert will be generated when the data contents of S increase the view change output for view Y (e.g. an amount or rate of view data changes) beyond a certain threshold. In some embodiments, the increase in view change output may be determined empirically based on monitored performance metrics of the view (e.g. the amount of view change data produced in the last time period). In some embodiments, the view change output may be determined based on an analysis of the current contents of the source data object S and the view definition of view Y. For example, the view definition may specify to only forward changes for data meeting a particular filter criterion. Embodiments of the MVMS may periodically check the data contents of S using the filter criterion to see if the amount of data satisfying the filter criterion has significantly increased. If so, the MVMS will issue an alert to the target data store 530*b* indicating the expected increase in the view change output. In some embodiments, this periodic checking of the data contents of S may be explicitly configured by the view's owner (e.g., as a specific query) along with the view definition itself.

In the last example, alert policy 520*e* specifies to generate an alert when the source data object experiences an outage or is otherwise unavailable. The outage may be signaled by the source data store 510, or detected by the MVMS 210 via monitoring. The outage may have a variety of causes, such as an unexpected failure of the source data store or a planned downtime at the source data store. In some embodiments, the outage alert may indicate additional information such as the reason for the outage, a status of recovery from the outage, and/or an estimated or expected time of return to availability. In some embodiments, such an alert may be used by the target data store 530*c* to provide information about the outage to its users (e.g. users of the materialized view 532*c*). In some embodiments, the target data store may temporarily reduce resource allocations of the target data object Z 532*c* in response to the outage.

Figure 6A:
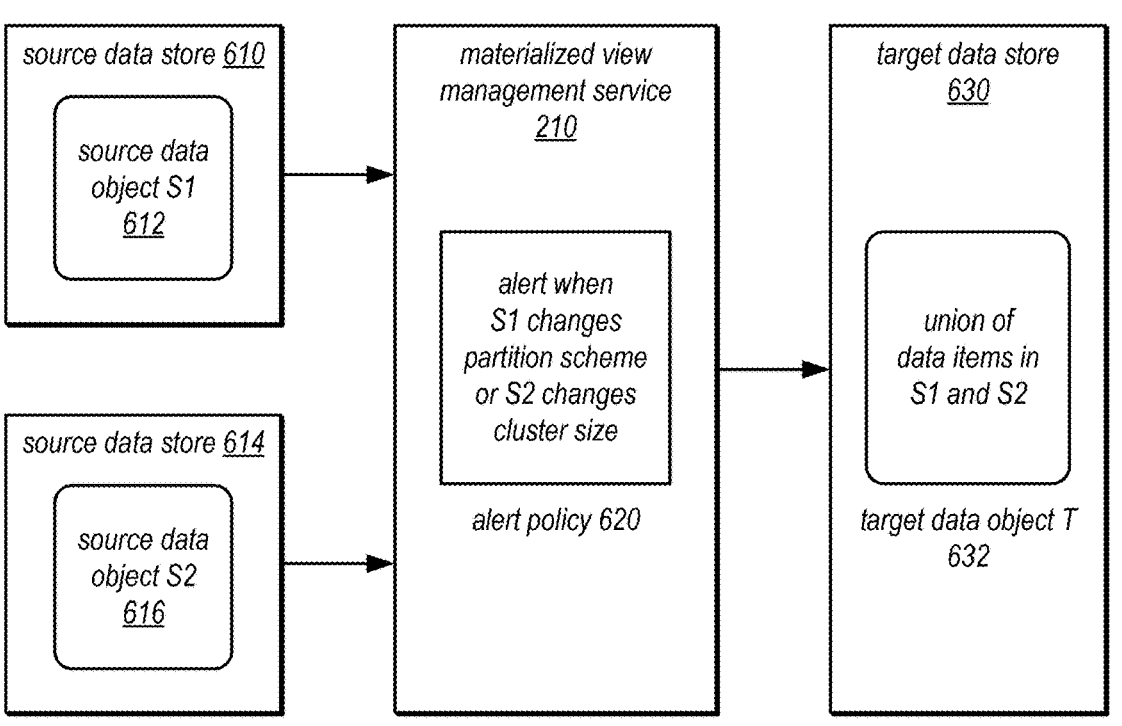
FIGS. 6A and 6B illustrate example resource change alert policies for materialized views used by a materialized view management service, according to some embodiments.
Figure 6B:
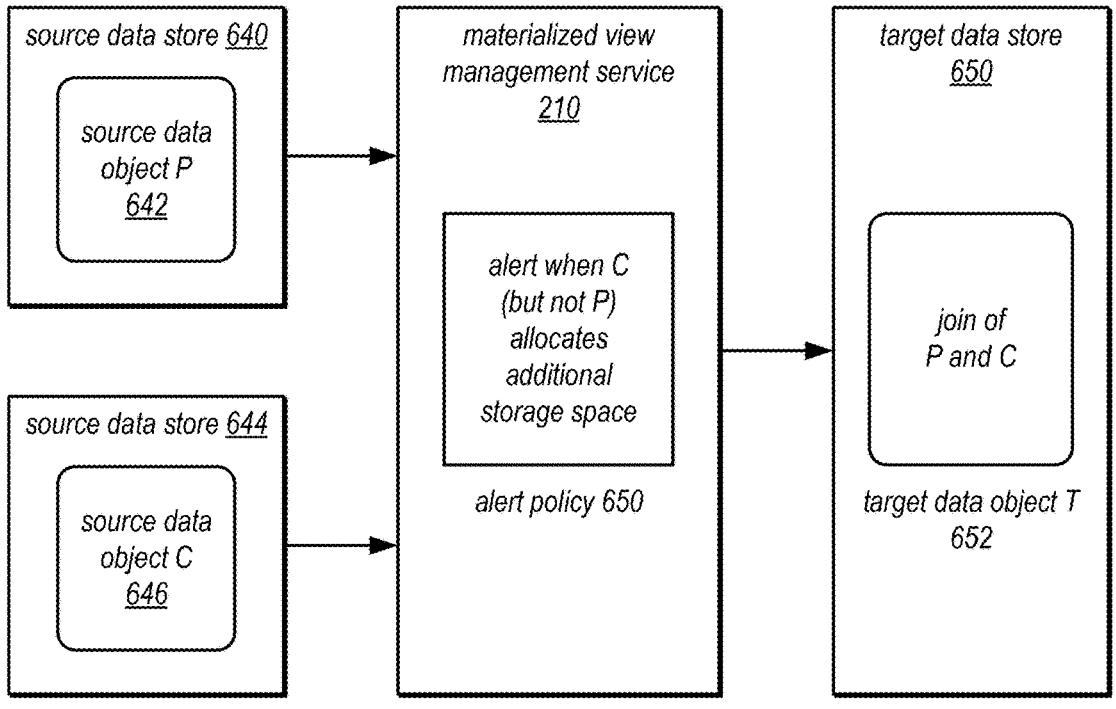

FIGS. 6A and 6B illustrate example resource change alert policies for materialized views used by a materialized view management service, according to some embodiments.

As shown in FIG. 6A, materialized view 632 (target data object T) is defined to be a union of data items from source data object S1 612 in data store 610 and source data object S2 614 in data store 614. In this example, the resource change alert policy 620 is configured to take into account the resource allocation of both source data objects 612 and 616. As shown, a resource change alert will be issued when either S1 changes its partition scheme or S2 changes a cluster size (e.g. for a cluster of writer nodes of S2). These two types of resource allocation changes are specific to the architecture of the two data stores 610 and 614, and the resource change alert is defined based on the different types of resource allocation changes.

FIG. 6B shows another materialized view 652 that is defined based on two source data objects: source data object P 642 in data store 640 and source data object C 646 in data store 644. However, in this example, the view 652 is defined as a join of the two data source object P and C. For example, the join may specify a one-to-many relationship between data items from the parent object P to the child object C. In this situation, the alert policy 650 is configured to only issue resource change alerts based on resource changes in the child object C (e.g. when additional storage space is allocated to C), because growth of the child object will dominate the resource usage of the view 652. In general, the alert policy may be used to define a variety of custom alerts depending on the situation and the view definition. In some embodiments, the alert policy may be defined alongside the view definition or as part of the view definition.

Figure 7:
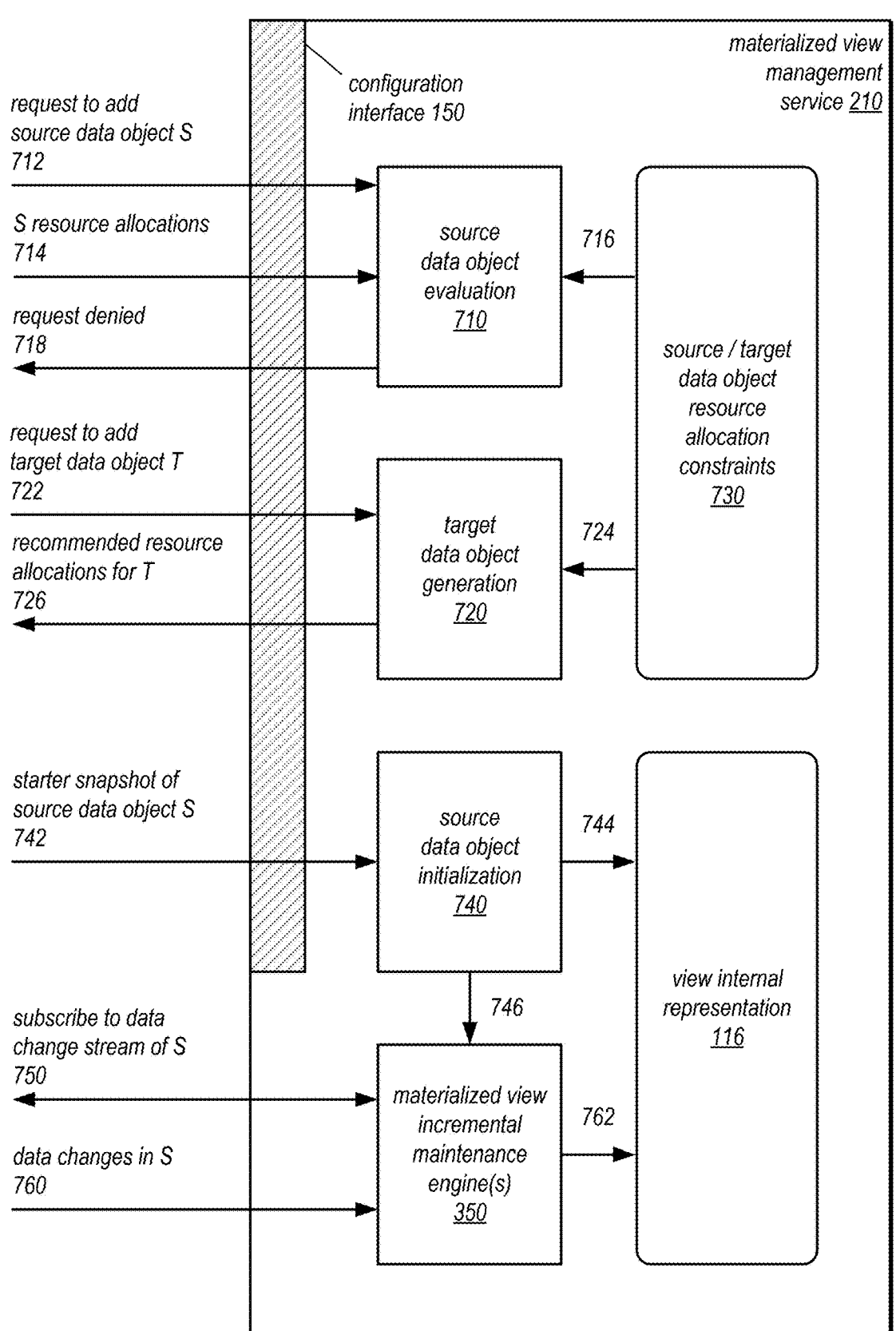
FIG. 7 illustrates various functionalities associated with configuration of a materialized view managed by a materialized view management service, according to some embodiments.

FIG. 7 illustrates various functionalities associated with configuration of a materialized view managed by a materialized view management service, according to some embodiments.

As shown, in some embodiments, MVMS 210 may implement a source data object evaluation component 710 and a target data object generation component 720, which may be used to control the resource allocations of source and target data objects being added to a materialized view. In some embodiments, the MVMS 210 maintains a set of source/target data object resource allocation constraints 730, which represent the rules used to by the evaluator 710 and generator 720.

As shown in the top example, a request 712 to add a source data object S is received via the configuration interface 150. In response to the request, the source data object resource evaluator will obtain the resource allocations of S 714 and evaluate the resource allocations based on 716 the resource allocation constraints 730. Depending on the embodiment, the resource allocations of S may be provided as part of the request 712, or collected by the MVMS 210 by querying the source data store.

Depending on the embodiment, the source/target data object resource allocation constraints may take a variety of forms. In some embodiments, the constraints may be rules that are specified in a manually configurable policy (e.g. the view definition). A constraint may indicate, for example, that the source data store's maximum write throughput limit cannot exceed a percentage of the write capacity of the MVMS or the target data object(s). As another example, another constraint may specify that a target data object must have allocated storage space of more than a minimum amount. In some embodiments, the constraints 730 may be automatically computed based on user preferences and/or the view definition. In some embodiments, the constraints 730 may be programmatically adjusted by the MVMS based on changes in the view's performance.

As shown in this example, the source data object resource evaluator 710 determines that the resource allocation of S violates one or more of the constraints 730. As a result, a response 718 denying the request is returned. The response 718 may indicate the reason for the denial and specify one or more recommendations for changes to the resource allocations of the source data object so that it can pass the evaluation.

In the next example in the figure, another request 722 is received to add a target data object T to the view. In some embodiments, the target data object T has not yet been created, and the target data object generation component 720 will generate instructions for creating the target data object based on the constraints 730. These instructions may include a recommendation 726 or actual commands for resource allocation. Thereafter, the target data store T may be registered to the MVMS via additional requests to the service. Such requests may indicate, among other parameters, the number of partitions of the view change stream to create for the target data store, and allow the target data store to subscribe to the view change stream partitions as discussed in connection with 456 of FIG. 4. In some embodiments, once a new source data object or target data object has been registered to a view in the MVMS, their resource allocation information will be stored by the MVMS and used to update the resource allocation constraints 730 to evaluate further data stores added to the view.

The next example in the figure relates to how a new source data object S may be initialized when it is first added to a view. In some situations, the new source data object may have a long change history in the form of a log. The creator of the view may not care about the historical changes of S, only the object's current state. Accordingly, embodiments of the MVMS will allow the user to upload, via the configuration interface, a starter snapshot 742 of the new source data object S. This snapshot will be consumed by a source data object initialization component 740, which may be a subcomponent of the materialized view creation component 340. In some embodiments, the initializer 740 is able to consume the snapshot in a native format as generated by the source data store, and convert or transform 744 that snapshot into the view internal representation 116. This initialization step thus avoids the MVMS having to replay the historical changes of the source data object, which may overwhelm the resources of the service or target data object(s).

As shown, once the starter snapshot of the source data object S is fully consumed and transformed into the internal representation 116, the initializer component 740 will notify 746 the materialized view incremental maintenance engine(s) 350 to being the view updating process. In some embodiments, the maintenance engine(s) 350 will subscribe 750 to the data change stream of S and initiate the necessary network connections and view resources in the service. These connections and resources will stand ready to receive any subsequent data changes 760 from S and then appropriately update 762 the internal representation of the view.

While not shown in the figure, when the initial snapshot of the source data object is consumed, embodiments of the MVMS may also generate an initial snapshot of the target data object that can be loaded into the target data store as the initial state of the materialized view. In some embodiments, the initial snapshot of the target data object will be generated in a native format of the target data store. In some embodiments, the collection of the source data object starter snapshot and/or the creation of the target data object may be performed in an automated process managed by the MVMS.

FIG. 8 is a flowchart illustrating a process of propagating resource scaling information from a source data store to a target data store of a materialized view, according to some embodiments. The depicted process may be performed by an embodiment of the MVMS 210 or view management system 110, as discussed previously.

At operation 810, data changes (e.g. data changes 124) in a source data object (source data object 122) stored in a source data store (source data store 120) are received from the source data store. As discussed, the MVMS may implement a view engine to transform these data changes into view data changes to be applied to a materialized view. In some embodiments, the data changes may be sent to the MVMS as a stream (or stream partitions) over one or more network connections. In some embodiments, the source data store may occasionally make resource allocation changes to the source data object. These changes may be made programmatically (e.g. as part of a resource auto-scaling process), or manually by human operators. Examples of resource allocation changes may include, inter alia, changes to a partition or sharding scheme of the source data object, changes to the amount of compute or storage nodes allocated to the source data object, changes to a write throughput limit of the source data object, and changes to a data storage limit of the source data object.

At operation 820, the MVMS sends, to the target data store, view data changes to be applied to the materialized view of the source data object stored in the target data store. As discussed, the view data changes may be generated by a view engine component 112, which is configured to filter and transform the data changes from the source data object into view data changes on the materialized view, according to a view definition of the materialized view. In some embodiments, the MVMS may implement a serverless execution model, where resources provisioned to individual view pipelines are automatically managed and scaled based on observed demand.

At operation 830, the MVMS receives resource metadata (e.g. resource metadata 129) about the source data object from the source data store. The resource metadata 129 may indicate a resource allocation change on the source data object as discussed previously. In some embodiments, the resource metadata may be received via a specialized interface of the MVMS such as the resource metadata receiving interface 142 of FIG. 1. In some embodiments, the resource metadata may be embedded in the data change stream of the source data object, for example, as resource change events (e.g. a partition split event 432) or metadata attributes of data change entries in the data change stream.

At operation 840, the MVMS generates, to the target data store, a resource change alert (e.g. resource change alert 148) based on the change to the resource allocation of the source data object. In some embodiments, the resource change alert may indicate the resource allocation change in the source data object. In some embodiments, the resource change alert may be triggered by resource changes at the MVMS (e.g. the auto-scaling changes performed in response to the source data object resource allocation changes). In some embodiments, the alert may be triggered based on the performance metrics of the view measured by the MVMS. The resource change alert may be embedded within the view data change stream transmitted to the target data store, or generated via a specialized resource change alert interface 146 of the MVMS. As discussed, in some embodiments, the resource change alert may be consumed programmatically by the target data store so that it can make resource alloca- tion changes to the target data object (e.g. to increase the write throughput limit or partitioning of the object to match the changes on the source data object). In some embodi- ments, the resource change alert may be directed to a human (e.g. an administrator of the target data store), so that the administrator can examine the resource allocation changes and, if necessary, make corresponding resource allocation changes on the target data object.

Figure 9:
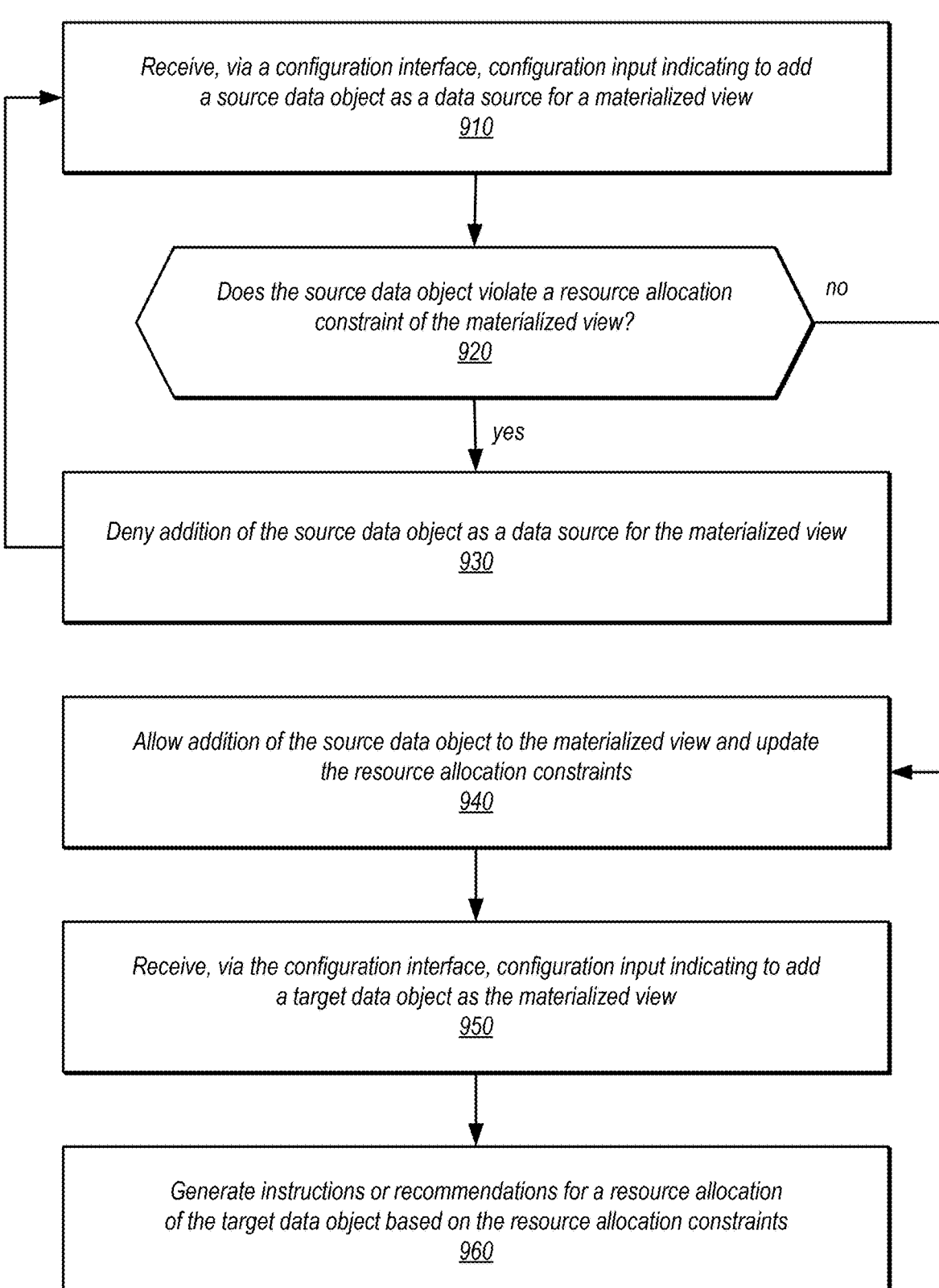
FIG. 9 is a flowchart illustrating a process of adding source and target data objects to a materialized view managed by a materialized view management service, according to some embodiments.

FIG. 9 is a flowchart illustrating a process of adding source and target data objects to a materialized view man- aged by a materialized view management service, according to some embodiments. The depicted process may be per- formed by an embodiment of the MVMS 210 or view management system 110, as discussed previously.

At operation 910, the MVMS receives, via a configuration interface (e.g. configuration interface 150), configuration input indicating to add a source data object (e.g. source data object 122) as a data source for a materialized view. In some embodiments, the configuration information may be submit- ted as part of a view creation process, which may be performed via a GUI provided by the MVMS. In some embodiments, the configuration information may indicate the view definition, as well as certain resource allocation information of the source data object. In some embodiments, the MVMS (e.g. a source data object evaluation component 710) may obtain the resource allocation information from the source data store using one or more queries.

At operation 920, a determination is made (e.g by the source data object evaluation component 710) whether the source data object violates a resource allocation constraint (e.g. resource allocation constraints 730) associated with the view. For example, the resource allocation constraint may indicate that the source data object cannot have a maximum write throughput or storage capacity greater than a threshold, based on known resource allocations of the MVMS or target data object(s).

If the source data object violates one or more resource allocation constraints, the process proceeds to operation 930, where the request to add the source data object to the view is denied. The denial may be returned through the configu- ration interface. In some embodiments, the denial may provide information about why the request was denied (e.g. the particular constraint(s) that were violated), and recom- mendations or suggestions on how to change the resource allocation of the source data object so that it does not violate the constraint(s).

If the source data object does not violate the resource allocation constraint(s), the process proceeds to operation 940, where the addition of the source data object is allowed. In some embodiments, metadata about the source data object (e.g. its resource allocation information) may be collected and stored as part of the view metadata. In some embodi- ments, once the source data object is registered, its resource allocation information may be used to update the resource allocation constraints of the view (e.g. to require down- stream view objects to implement minimal resource alloca- tions). In some embodiments, the MVMS may initialize an internal representation of the source data object by request- ing and consuming a current snapshot of the source data object.

At operation 950, configuration input is received via the configuration interface that indicates a target data object to be added or created as the materialized view. As with the request to add the source data object, operation 950 may be performed as part of the view creation process. The con- figuration input may indicate the target data store where the target data object is to be created and the view definition (e.g. a query specified in the hub data model).

At operation 960, the MVMS (e.g. the target data object generation component 720) generates instructions or recom- mendations for a resource allocation of the target data object based on the resource allocation constraints. For example, the generated instructions or recommendations may ensure that sufficient resources are allocated to the target data object so that it can handle the expected write throughput and data storage required by the source data object(s). In some embodiments, the MVMS may execute one or more routines to programmatically cause the target data store to be created in the target data store in accordance with the view's resource allocation constraints.

Figure 10:
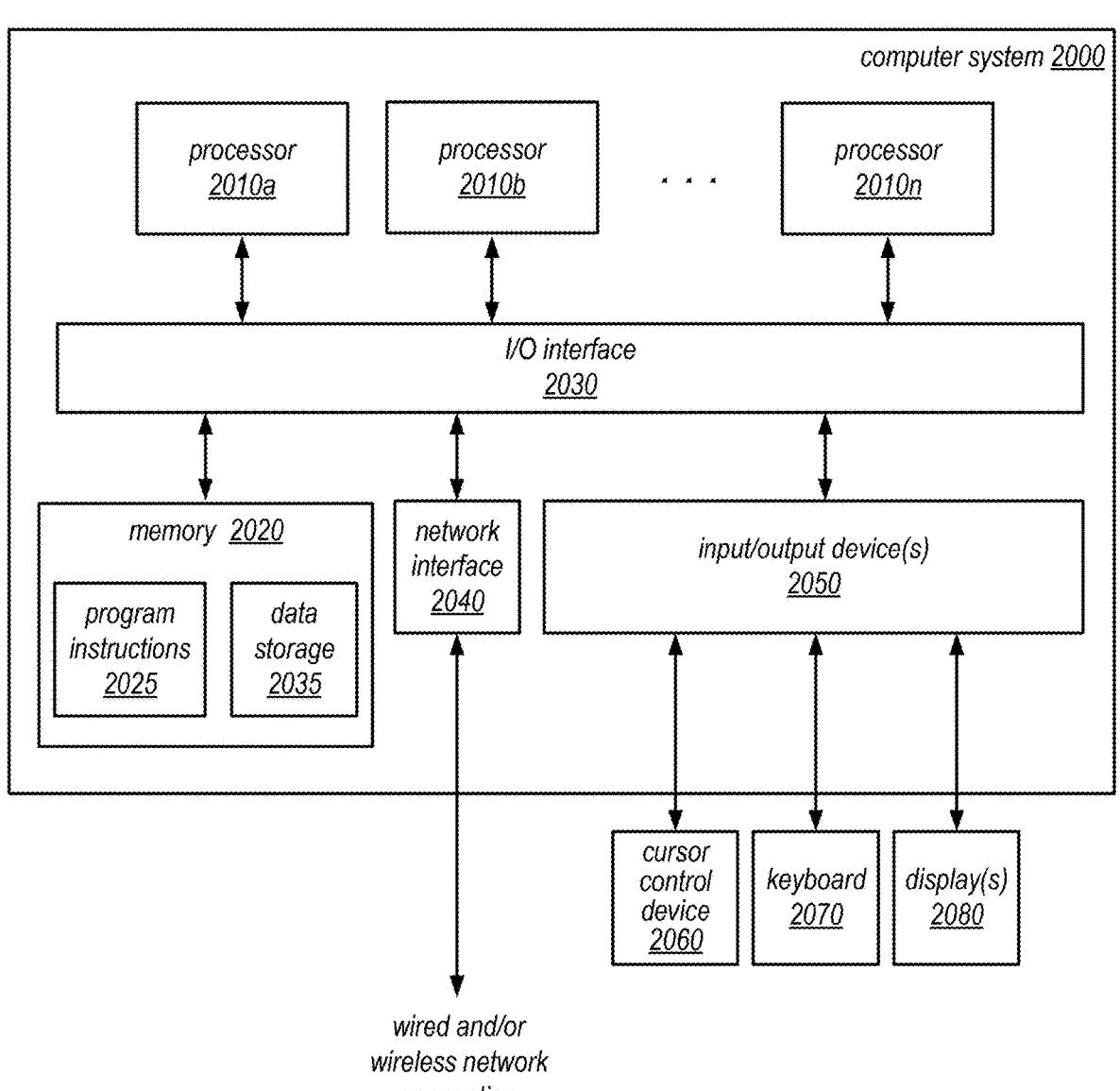
FIG. 10 illustrates an example computer system configured to implement one or more portions of the materialized view management service described herein, according to some embodiments.

FIG. 10 illustrates an example computer system (com- puter system 2000) configured to implement one or more portions of the materialized view management service described herein, according to some embodiments.

In different embodiments, computer system 2000 may be any of various types of devices, including, but not limited to, a personal computer system, desktop computer, laptop, notebook, or netbook computer, mainframe computer sys- tem, handheld computer, workstation, network computer, a camera, a set top box, a mobile device, a consumer device, video game console, handheld video game device, applica- tion server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch-or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different por- tions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Proces- sors 2010 may be any suitable processor capable of execut- ing instructions. For example, in various embodiments, processors 2010 may be general-purpose or embedded pro- cessors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosed inventions embrace all such modifications and changes and, accordingly, the above description to be regarded in an illustrative rather than a restrictive sense.

What is claimed is:

1. A system, comprising:

at least one processor; and a memory, storing program instructions that when executed on or across the at least one processor, cause the at least one processor to:

create, in a target data store of a second type of database system, a materialized view of a source data object stored in a source data store of a first type of database system;

receive, via a first interface, resource metadata about the source data object from the source data store, wherein the resource metadata indicates a change to a resource allocation of the source data object;

determine, based at least in part on a view definition of the materialized view, to update a resource allocation of the materialized view to handle an amount of data from the source data store after the change to the resource allocation of the source data object; and generate, via a second interface, a resource change alert based at least in part on the change to the resource allocation of the source data object, wherein the resource change alert includes an instruction that specifies the update to a resource allocation of the materialized view in response to the change to the resource allocation of the source data object.

2. The system of claim 1, further comprising:

program instructions stored on the memory or other memory, that when executed on or across the at least one processor or another processor, cause a target connector to:

obtain changes to be made to the materialized view; and perform one or more translations on the changes, comprising:

data-type conversion, operation conversion, or generation of one or more parameters needed to perform an update request to make a corresponding change in the materialized view.

3. The system of claim 1, further comprising:

program instructions stored on the memory or other memory, that when executed on or across the at least one processor or another processor, cause a target connector to, for one or more obtained changes to be made to the materialized view:

enforce one or more ordering constraints;

perform deduplication; or track whether the changes are performed successfully.

4. The system of claim 1, wherein the source data object is stored in a source data store of a first type of database system of a service provider network that provides at least compute and storage services, comprising the first type of database system, over a service provider network to clients; and wherein the materialized view of the source data object is stored in a target data store of a second type of database system of a client premise network.

5. The system of claim 1, further comprising:

a service provider network configured to provide compute and storage service, comprising the first and second types of database systems, over a service provider network to clients;

wherein the source data store and the target data store are implemented on the service provider network, via the first and second types of database systems.

6. The system of claim 1, wherein:

the at least one processor and the memory storing program instructions are provisioned in a network-accessible service provider network; and at least one of the first data store and the second data store is provisioned outside the network-accessible service provider network.

7. The system of claim 1, wherein the change to the resource allocation of the source data object includes a change to one or more of:

a partition or sharding scheme of the source data object;

an amount of compute or storage nodes allocated to the source data object;

a write throughput limit of the source data object; and a data storage limit of the source data object.

8. A method, comprising:

performing, by one or more processors and associated memory:

creating, in a target data store of a second type of database system, a materialized view of a source data object stored in a source data store of a first type of database system;

receiving, via a first interface, resource metadata about the source data object from the source data store, wherein the resource metadata indicates a change to a resource allocation of the source data object;

determining, based at least in part on a view definition of the materialized view, to update a resource allocation of the materialized view to handle an amount of data from the source data store after the change to the resource allocation of the source data object; and generating, via a second interface, a resource change alert based at least in part on the change to the resource allocation of the source data object, wherein the resource change alert includes an instruction that specifies the update to a resource allocation of the materialized view in response to the change to the resource allocation of the source data object.

9. The method of claim 8, further comprising:

obtaining, by a target connector, changes to be made to the materialized view; and performing, by the target connector, translation on the changes, comprising:

data-type conversion, operation conversion, or generation of one or more parameters needed to perform an update request to make a corresponding change in the materialized view.

10. The method of claim 8, further comprising, for one or more obtained changes to be made to the materialized view:

enforcing one or more ordering constraints;

performing deduplication; or tracking whether the changes are performed successfully.

11. The method of claim 8, wherein the source data object is stored in the source data store of the first type of database system of a service provider network that provides at least compute and storage services, comprising the first type of database system, over a service provider network to clients; and wherein the materialized view of the source data object is stored in a target data store of a second type of database system of a client premise network.

12. The method of claim 8, wherein the change to the resource allocation of the source data object includes a change to one or more of:

a partition or sharding scheme of the source data object;

an amount of compute or storage nodes allocated to the source data object;

a write throughput limit of the source data object; and a data storage limit of the source data object.

13. The method of claim 8, further comprising:

identifying the resource metadata in a stream of data changes on the source data;

detecting, from the resource metadata, a change in a partition scheme of the source data object;

changing, in response to the detection of the partition scheme change, a stream partition scheme used to send view data changes to the target data store; and indicating the change of the stream partition scheme in the resource change alert.

14. The method of claim 8, further comprising:

tracking one or more performance metrics of the materialized view, including a backlog metric or a latency metric; and indicating the one or more performance metrics in the resource change alert.

15. One or more non-transitory computer-readable storage media storing program instructions that when executed on or across one or more computing devices cause the computing devices to:

create, in a target data store of a second type of database system, a materialized view of a source data object stored in a source data store of a first type of database system;

receive, via a first interface, resource metadata about the source data object from the source data store, wherein the resource metadata indicates a change to a resource allocation of the source data object;

determine, based at least in part on a view definition of the materialized view, to update a resource allocation of the materialized view to handle an amount of data from the source data store after the change to the resource allocation of the source data object; and generate, via a second interface, a resource change alert based at least in part on the change to the resource allocation of the source data object, wherein the resource change alert includes an instruction that specifies the update to a resource allocation of the materialized view in response to the change to the resource allocation of the source data object.

16. The one or more non-transitory computer-readable storage media of claim 15, wherein the program instructions, when executed, implement a target connector to:

obtain changes to be made to the materialized view;

perform target-specific translation on the changes, comprising:

data-type conversion, operation conversion, or generation of one or more parameters needed to perform an update request to make a corresponding change in the materialized view.

17. The one or more non-transitory computer-readable storage media of claim 15, wherein the program instructions, when executed, implement a target connector to, for one or more obtained changes to be made to the materialized view:

enforce one or more ordering constraints;

perform deduplication; or track whether the changes are performed successfully.

18. The one or more non-transitory computer-readable storage media of claim 15, wherein the program instructions, when executed, cause the resource change alert to be generated via a programmatic interface subscribed to by the target data store.

19. The one or more non-transitory computer-readable storage media of claim 15, wherein the program instructions when executed on or across the one or more computing devices to:

detect, from the resource metadata, a change in a partition scheme of the source data object;

in response to the detection of partition scheme change, change a stream partition scheme used to send the view data changes to the target data store; and indicate the change of the stream partition scheme in the resource change alert.

20. The one or more non-transitory computer-readable storage media of claim 15, wherein the resource change alert is generated based at least in part on a configured policy of the materialized view.

\* \* \* \* \*